Dec. 1, 1925.
J. C. FRENCH
1,563,479
TRACTOR DRIVING AND STEERING MECHANISM
Filed Nov. 19, 1918    2 Sheets-Sheet 1
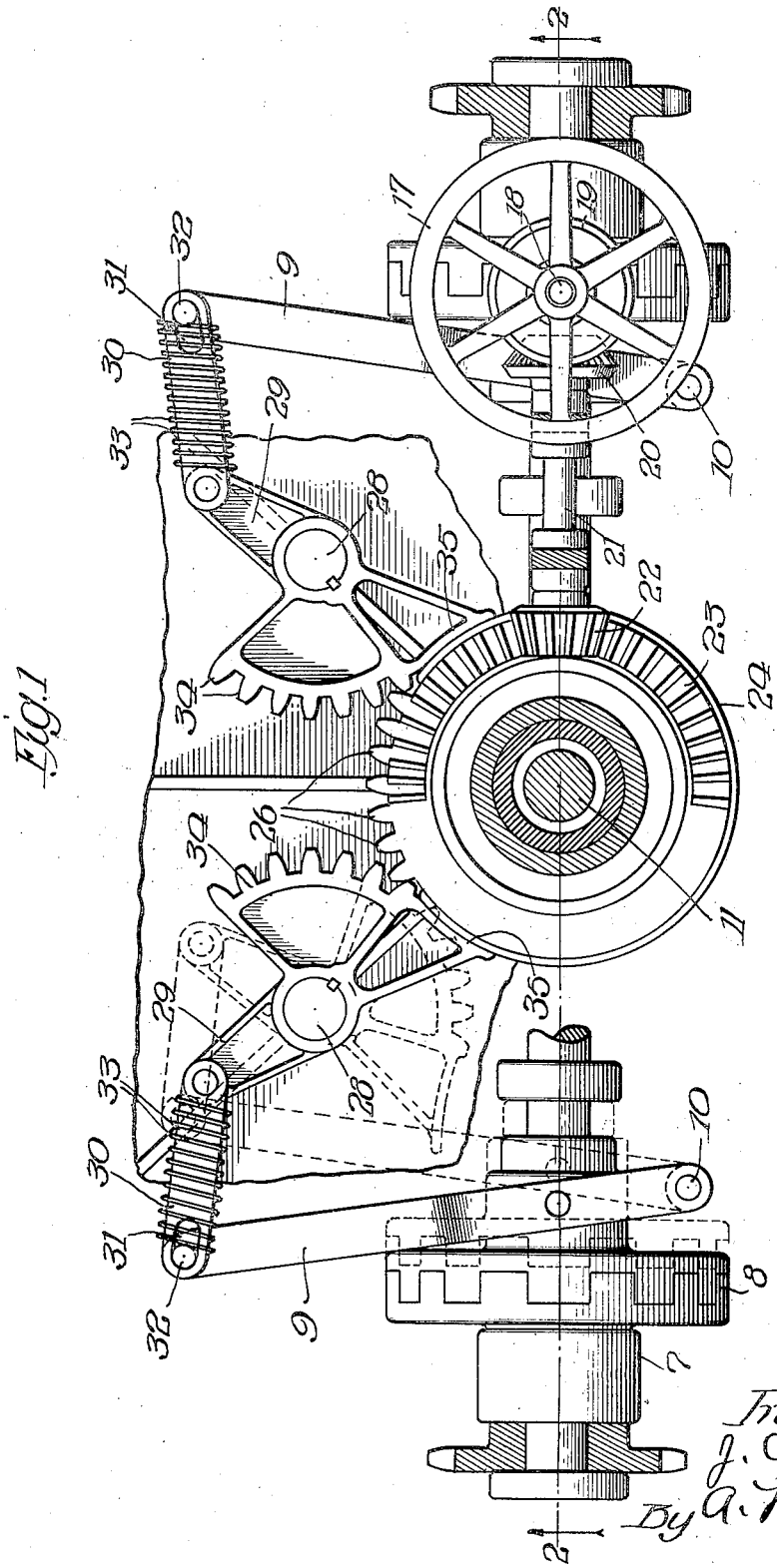

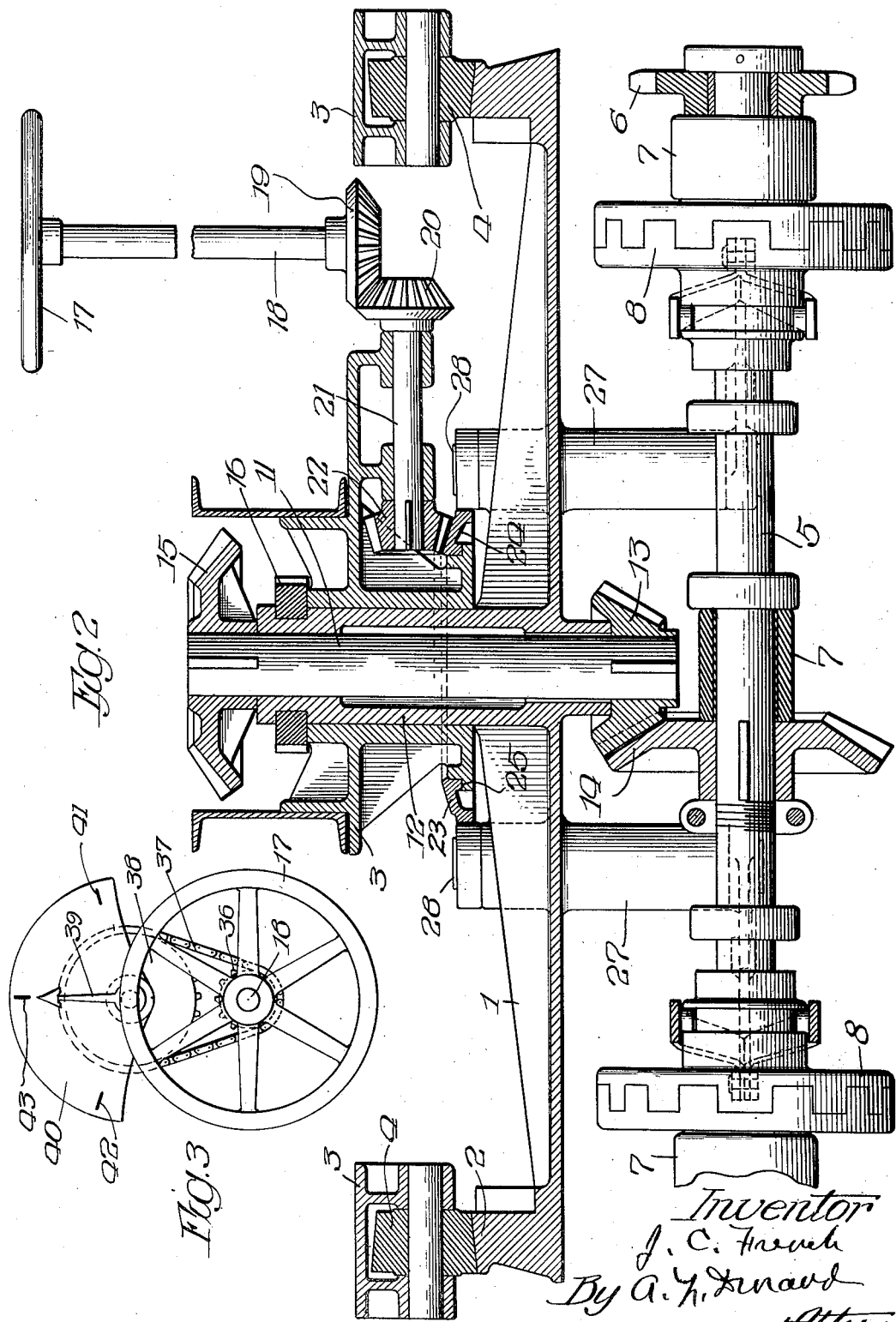

Patented Dec. 1, 1925.

1,563,479

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

TRACTOR DRIVING AND STEERING MECHANISM.

Application filed November 19, 1918. Serial No. 263,210.

*To all whom it may concern:*

Be it known that I, JAMES C. FRENCH, a citizen of the United States of America, and a resident of Chicago, Illinois, have invented a certain new and useful Improvement in Tractor Driving and Steering Mechanism, of which the following is a specification.

This invention relates to tractors of that kind in which the direction of travel of the vehicle is controlled through the medium of the power transmitting connections which communicate the driving power to the traction devices at opposite sides of the vehicle. For example, in a tractor supported entirely by one traction device at one side and another traction device at the other side, the steering is obtained by causing one traction device to operate faster than the other, or by stopping one of them, thereby causing the machine to turn either to the right or the left. Various means may be employed for this purpose, such as clutch mechanism through which the power is transmitted to the traction means or devices at opposite sides of the vehicle, the opening of the clutch at one side serving to disconnect the power at this side, but leaving the transmission closed at the other side, so that the tractor will turn in the desired direction.

One object of the invention is to provide an improved construction and arrangement whereby a tractor of this kind may be steered by a rotary hand wheel, similar to the steering wheel of an ordinary tractor or other self-propelled vehicle, and whereby the steering position may be located on a turn-table which turns about a vertically disposed axis relatively to the traction devices below.

It is also an object to provide certain details and features of construction and combinations tending to increase the general efficiency and the desirability of a tractor of this particular character in which the steering is accomplished by controlling the transmission of power to the traction devices at opposite sides of the vehicle.

To these and other useful ends the invention consists in matters hereinafter set forth and claimed.

In the accompanying drawings—

Fig. 1 is a plan of a portion of the construction of a tractor having steering means embodying the principles of the invention.

Fig. 2 is a vertical section on line 2—2 in Fig. 1.

Fig. 3 is a diagram showing the indicating device which is connected to the steering shaft to indicate the condition of the steering mechanism.

As thus illustrated, the invention comprises a lower frame or body 1 of any suitable character, having a track 2 which is circular, and an upper frame or body 3, of any suitable character, provided with rollers 4 arranged to travel on said track. The turn-table thus provided enables the upper frame or body 3 to turn about a vertical axis in the well known manner. The tractor may be driven by traction wheels or other traction devices, it will be understood, and no description or illustration thereof will be necessary. Power is communicated to the traction means at opposite sides of the vehicle from a transverse shaft 5 provided with sprocket wheels 6 at the opposite ends thereof, this shaft being mounted in suitable bearings 7 on the lower frame 1 of the tractor. The sprocket wheels 6 are then connected by sprocket chains, of any suitable character, with the traction wheels or other traction devices. Clutches 8 of any suitable character are mounted on the shaft 5 inside of the bearings 7, and are so constructed that the sprocket wheels 6 are not rotated by the rotation of the shaft 5 except when both clutches are closed. When one clutch is open, its allotted sprocket wheel 6 will not rotate, but as the other clutch remains closed, the other sprocket wheel will continue to rotate. Horizontally disposed levers 9 pivoted at 10 are provided for the operation of said clutches, which latter can be of the kind ordinarily known as jaw-clutches, one member of each clutch being loose on the shaft, and the other being splined thereon, so that the sprocket wheels 6 which are rigid with the loose members of the clutches, are not driven except when the splined members are pushed into interlocking engagement with the loose members.

Inasmuch as the power plant, such as an ordinary internal combustion engine, (not shown), is mounted on the turn-table formed by the upper body 3, it follows that some arrangement is desirably employed for driving the traction devices by transmission of power downwardly through the center of the turn-table. This is accomplished through the medium of a vertically disposed shaft 11 which is mounted to rotate in bearings in the cylindrical upstanding portion 12 of the lower frame 1, and which is provided at its lower end with a bevel pinion 13 to engage the bevel gear 14 on the shaft 5, whereby the latter is rotated when the shaft 11 is rotated. For the purpose of rotating the shaft 11, a bevel gear 15 is fixed on the uper end of this shaft. Power can be communicated from the power plant to the bevel gear 15 through the medium of any suitable, known or approved means. A gear ring 16 is fixed on the upper end of the cylindric upstanding portion 12, and is gear-connected in any suitable manner with the mechanism on the turn-table by which the latter is turned in either direction. Thus the lower frame 1 is supported by the traction devices, while the upper frame 3 is free to turn about a vertical axis; and the shaft 11 is coincident with this axis and serves to transmit the power from the power plant to the driving shaft 5, whereby the traction means are driven to propel the vehicle.

Now as the steering position is also preferably on the turn-table, it follows that some special arrangement must be employed for connecting the ordinary hand wheel 17 with the pivoted levers 9 by which the clutches are controlled to turn the vehicle to the right or the left. The hand wheel 17, it will be understood, has its vertically disposed shaft or steering column 18 suitably supported on the upper body frame 3, and this steering column is provided at its lower end with a bevel pinion 19 adapted to engage the bevel gear 20 on the horizontally disposed shaft 21, which latter is mounted in suitable bearings on the turn-table 3, whereby the rotation of the hand wheel 17 will rotate this horiontally disposed shaft one way or the other. The shaft 21 has its inner end provided with a bevel pinion 22 and engages the bevel gear teeth 23 on the gear ring 24, which latter is mounted to turn on a ledge or bearing 25 formed on the bottom of the turn-table 3, and which is also provided at one edge with spur gear teeth 26, this ring being rotatable, therefore, by the hand wheel 17 when the latter is turned one way or the other. The lower frame or body 1 is provided with a pair of vertically disposed bearings 27 in which are mounted the vertically disposed rock shafts 28, which latter have their lower ends provided with crank arms 29 connected by links 30 with the levers 9 previously mentioned. These links 30 are preferably provided with slots 31 for the pivots 32 by which they are connected to said levers, so that some lost motion is provided, and springs 33 are provided to yieldingly keep the pivots 32 at the outer ends of these slots; but each spring can yield enough to take up any motion in the arms 29 which may occur after the clutches are closed. The upper ends of the rock shafts 28 are provided with segment gears 34, the teeth of which engage the spur gear teeth 26 previously mentioned, whereby rotation of the ring 24, one way or the other, will operate one of said segment gears. The teeth 26, however, only extend for a short distance along the periphery of the gear ring, and the segmental gears 34 have portions 35 which bear against the smooth periphery of the gear ring at each side of the group of teeth on said rings. With this arrangement, the clutches are normally closed, and the segmental gears 34 are normally in the position shown in Fig. 1, so that the tractor is in condition to travel straight ahead. When the hand wheel 17 is turned in one direction, the gear teeth 26 on the oscillatory ring 24 will mesh with the teeth of one of the segmental gears 34, and will thereby turn one of the rock shafts 28 in a direction to open one of the clutches, inasmuch as the lever 9 of this clutch will be pulled inwardly toward the center of the machine; but the other segmental gear 34 will remain stationary, inasmuch as its curved portion 35 will remain in frictional contact with the smooth portion of the periphery of the gear ring 24, and hence the other clutch will remain closed. A reverse operation will take place, of course, when the hand wheel 17 is turned in the opposite direction. It will be seen, therefore, that when one clutch is opened, the tractor will turn to the right, whereas when the other clutch is opened, the tractor will turn to the left; and this is accomplished in a machine in which the power plant and the steering position are both located upon at turn-table body, to that both the transmission of power and the steering control are transmitted through means which turn about a vertical axis coincident with the axis of the turn-table; for the power transmitting shaft 11 is coincident with the axis of the turn-table, and the gear ring 24, which is a part of the steering gear, is oscillatory about said axis, in the manner explained. Either clutch, when opened, stops the transmission of power to that side of the vehicle, and the continued operation of the traction means at the other side will then cause the tractor to travel on the line of a circle the vertical axis of which is approximately at the center of the traction device which remains stationary. Notwithstanding that the steering is accomplished by controlling the transmission of power to the traction means, and notwithstanding the fact that both the power plant and the steering position are located upon a turn-table which turns about a vertical axis, the driver is always capable of steering the tractor in the desired direction, regardless of the position of the turn-table.

As shown in Fig. 3, the steering shaft 18 is provided with a sprocket wheel 36 connected by a sprocket chain 37 with a larger sprocket wheel 38, all suitably mounted on the platform of the tractor. A pointer 39 is rigidly connected to the sprocket wheel 38, so that it will swing to the right or the left, and a segmental dial 40 is provided for said pointer, having the right and left and middle positions indicated thereon, as by marks 41, 42, and 43, so that the driver can see at a glance in what condition the steering mechanism is at any particular time. When the pointer is opposite the mark 43, the driver will know that the mechanism is in condition to drive the tractor straight ahead; and if the pointer is opposite the mark 41, then it will be understood that the mechanism is in condition to cause the machine to turn to the right; and vice versa, if the pointer is opposite the mark 42, on the segmental dial, then the driver will understand that the mechanism is in condition to cause the machine to turn to the left. In other words, the rotation of the steering wheel 17 and its shaft 18 is communicated to the pointer 39, from a small sprocket wheel to a larger sprocket wheel, so that the steering wheel may turn clear around or make a complete rotation while the pointer is traveling a relatively short distance; but said pointer, being subject to control by the steering wheel, will always indicate correctly the position of the steering mechanism.

What I claim as my invention is:—

1. In a tractor of the class in which the direction of travel is governed by controlling the transmission of power to the traction devices at opposite sides of the vehicle, the combination of a turn-table, mechanism to communicate power to the traction devices, power transmission means to connect said mechanism with a source of power on the turn-table, and instrumentalities including steering gear connections to control said mechanism from a position on the turn-table, said instrumentalities including a pair of vertically disposed rock shafts connected to said mechanism, and the steering gear comprising a gear ring mounted to oscillate about the axis of said turn-table, means to connect said gear ring with said rock shafts, and means including bevel gearing whereby the driver operates said gear ring to steer the vehicle.

2. In a tractor of the class in which the direction of travel is governed by controlling the transmission of power to the traction devices at opposite sides of the vehicle, the combination of a turn-table, mechanism to communicate power to the traction devices, power transmission means to connect said mechanism with a source of power on the turn-table, and instrumentalities including steering gear connections to control said mechanism from a position on the turn-table, said mechanism including a clutch for each traction device, and said instrumentalities and steering gear comprising rock shafts connected to operate said clutches, a gear ring mounted to oscillate about the axis of said turn-table, segmental gears on said shafts to engage said ring, and a steering wheel connected to operate said ring, each segmental gear having means to prevent displacement thereof from normal position when the other one is operated.

3. A structure as specified in claim 1, in combination with an indicator supported on the turn-table and subject to control by said steering gear connections to show the condition of said mechanism.

4. In a tractor of the class in which the direction of travel is governed by controlling the transmission of power to the traction devices at opposite sides of the vehicle, the combination of a turn-table, mechanism to communicate power to the traction devices, power transmission means to connect said mechanism with a source of power on the turn-table, and instrumentalities including steering gear connections to control said mechanism from a position on the turn-table, said instrumentalities including a pair of vertically disposed rock shafts connected to said mechanism, and the steering gear comprising a gear ring mounted to oscillate about the axis of said turn-table, means to connect said gear ring with said rock shafts, and means including bevel gearing whereby the driver operates said gear ring to steer the vehicle.

5. In a tractor of the class in which the direction of travel is governed by controlling the transmission of power to the traction devices at opposite sides of the vehicle, the combination of a turn-table, mechanism to communicate power to the traction devices, power transmission means to connect said mechanism with a source of power on the turn-table, and instrumentalities including steering gear connections to control said mechanism from a position on the turn-table, said mechanism including a clutch for each traction device, and said instrumentalities and steering gear comprising rock shafts connected to operate said clutches, a gear ring mounted to oscillate about the axis of said turn-table, segment gears on said shafts to engage said ring, and a steering wheel connected to operate said ring, each segment gear having means to prevent displacement thereof from normal position when the other one is operated.

6. In a tractor of the class in which the direction of travel is governed by controlling the transmission of power to the traction devices at opposite sides of the vehicle, the combination of a turn-table, mechanism to communicate power to the traction devices, power transmission means to connect said mechanism with a source of power on the turn-table, and instrumentalities including steering gear connections to control said mechanism from a position on the turn-table, in combination with an indicator supported on the turn-table and subject to control by said steering gear connections to show the condition of said mechanism.

JAMES C. FRENCH.